United States Patent [19]
Naito et al.

[11] Patent Number: 5,790,368
[45] Date of Patent: Aug. 4, 1998

[54] CAPACITOR AND MANUFACTURING METHOD THEREOF

[75] Inventors: Yasuyuki Naito, Nagaokakyo; Motoo Hayashi, Muko, both of Japan

[73] Assignee: Murata Manufacturing Co., Ltd., Kyoto, Japan

[21] Appl. No.: 673,176

[22] Filed: Jun. 26, 1996

[30] Foreign Application Priority Data

| Jun. 27, 1995 | [JP] | Japan | 7-161051 |
| Jun. 27, 1995 | [JP] | Japan | 7-161052 |
| Jun. 27, 1995 | [JP] | Japan | 7-161053 |

[51] Int. Cl.⁶ .................. H01G 9/00; H01G 9/028
[52] U.S. Cl. .................. 361/523; 361/524; 361/527; 29/25.03
[58] Field of Search .................. 361/524, 527, 361/525, 526, 514, 528; 29/25.03, 25.42; 427/80; 264/58, 61

[56] References Cited

U.S. PATENT DOCUMENTS

| 4,419,310 | 12/1983 | Burn et al. | 264/59 |
| 5,117,333 | 5/1992 | Kakuma et al. | 361/527 |
| 5,144,536 | 9/1992 | Tsukadda et al. | 361/402 |
| 5,166,759 | 11/1992 | Ueno et al. | 257/624 |
| 5,266,079 | 11/1993 | Iga | 29/25.03 |
| 5,457,862 | 10/1995 | Sakata et al. | 29/250.3 |
| 5,461,537 | 10/1995 | Kobayashi et al. | 361/525 |

*Primary Examiner*—Leo P. Picard
*Assistant Examiner*—Anthony Dinkins
*Attorney, Agent, or Firm*—Ostrolenk, Faber, Gerb & Soffen, LLP

[57] ABSTRACT

A capacitor comprising: a porous sintered body 2 consisting mainly of titanium; a dielectric film 3 which is formed on the surface of the sintered body and which consists mainly of a perovskite type composite oxide having a general formula of $ATiO_3$; a conductor or semiconductor which is formed on the surface of the dielectric film; and a counter-electrode which conducts to the conductor or semiconductor and which faces the sintered body; wherein the porosity of the porous sintered body is 20% or more. The capacitor is fabricated by immersing the porous sintered body in an aqueous solution containing strontium or barium, by performing a hydrothermal treatment at a specified temperature to form a composite oxide film having the above-described general formula as a dielectric film 3 on the surface of the sintered body; by forming a conductor or semiconductor electrode 4 on the surface of the oxide film; and by forming a counter electrode which conducts to the electrode and which faces the sintered body.

20 Claims, 2 Drawing Sheets

5,790,368

CAPACITOR AND MANUFACTURING METHOD THEREOF

BACKGROUND OF THE INVENTION

1. Field of the Invention

The present invention relates to a capacitor and a manufacturing method therefor, and particularly to a capacitor comprising a porous sintered body consisting mainly of titanium and to a manufacturing method thereof.

2. Description of the Related Art

Known conventional capacitors of small size and large capacity include electrolytic capacitors such as tantalum electrolytic capacitors and aluminum electrolytic capacitors.

A tantalum electrolytic capacitor is a capacitor which uses an anodic oxide film of metallic tantalum as a dielectric, and has characteristics such as long life, favorable temperature characteristics, the capability of being miniaturized, and relatively good frequency characteristics.

Tantalum electrostatic capacitors, however, increase the product cost because the tantalum base material is expensive, and there is a limited ability to achieve an increase in capacity because it is difficult to increase the dielectric constant of the dielectric layer as a result of the fact that a monoxide layer is used as the dielectric layer.

An aluminum electrolytic capacitor has the characteristic that it gives a larger electrostatic capacity than that of the tantalum electrolytic capacitor, and it is widely used in power source circuits and other applications.

In such aluminum electrostatic capacitors, however, an aluminum anodic oxide film is used as the dielectric layer, and the leak current is large and life is short.

In addition, both the tantalum and aluminum types of capacitors described above have polarity, and because the polarity of the capacitor must be identified on mounting to an electronics circuit, the work efficiency decreases. Furthermore, because conventional electrostatic capacitors give a large equivalent series resistance, the high frequency characteristic is relatively poor.

Other than those electrolytic capacitors, laminated ceramic capacitors are widely used as small and large capacity capacitors. The laminated ceramic capacitors have characteristics such as favorable frequency characteristics, high insulation resistance, and large electrostatic capacity per unit volume.

In laminated ceramic capacitors, there have been attempts to decrease the thickness of the dielectric for miniaturizing and capacity-increasing. At a dielectric thickness of below 1 μm, however, no favorable layered structure has been realized.

SUMMARY OF THE INVENTION

The object of the present invention is to provide a capacitor which solves the above-described problems, which allows ready mounting to a circuit, and which is small in size and large in capacity, and to provide a method for manufacturing the capacitor.

A capacitor of the present invention comprises: a porous sintered body made of a metal consisting mainly of titanium; a dielectric film which is formed on at least a part of the surface of the sintered body and which consists mainly of a perovskite type composite oxide having a general formula of $ATiO_3$ (where A denotes Ba or Sr); a conductor or semiconductor which is formed on the surface of the dielectric film; and a counter-electrode which conducts to the conductor or semiconductor and which faces the sintered body, wherein the porosity of the porous sintered body is 20% or more.

A method for manufacturing the above-described capacitor comprises: immersing a porous sintered body made of a metal consisting mainly of titanium in an aqueous solution which has a pH value of about 13 or higher and which contains at least strontium or barium at a concentration of about 0.1 mole/l or more; heating the solution and the sintered body to a temperature of about 100° C. or above to apply a hydrothermal treatment to form a perovskite type composite oxide film having a general formula of $ATiO_3$ (where A denotes Ba or Sr) as a dielectric film on the surface of the sintered body; forming a conductor or semiconductor electrode on the surface of the perovskite type composite oxide film; and then forming a counter-electrode which conducts to the electrode and which faces the sintered body.

Another method for manufacturing the above-described capacitor applies the step of conducting a hydrothermal treatment by immersing the sintered body in the aqueous solution, thus performing a electrolytic treatment by passing an electric current between the electrode immersed in the aqueous solution and the sintered body simultaneously with the hydrothermal treatment.

A further method for manufacturing the above-described capacitor uses a porous sintered body consisting mainly of titanium, which porous sintered body is prepared by sintering a metallic powder having an average particle size of about 150 μm or less in a vacuum of about $1 \times 10^{-4}$ Torr or higher vacuum at a temperature ranging from about 500° C. to 1000° C.

A capacitor of the present invention also comprises: a porous sintered body made of a metal consisting mainly of titanium; a dielectric film which is formed on at least a part of the surface of the sintered body and which consists mainly of a perovskite type composite oxide having a general formula of $ATiO_3$ (where A denotes Ba or Sr); a conductor or semiconductor which is formed on the surface of the dielectric film; and a counter-electrode which conducts to the conductor or semiconductor and which faces the sintered body, wherein the conductor or semiconductor is made from a conductive polymer.

The above-described conductive polymer can be a TCNQ (7,7,8,8-tetracyanoquino-dimetane) type complex or a polypyrrole.

Also, the capacitor of the present invention can comprise: a porous sintered body which is made of a metal consisting mainly of titanium; a dielectric film which is formed on at least a part of the surface of the sintered body and which consists mainly of a perovskite type composite oxide having a general formula of $ATiO_3$ (where A denotes Ba or Sr); a conductor or semiconductor which is formed on the surface of the dielectric film; and a counter-electrode which conducts to the conductor or semiconductor and which faces the sintered body, wherein the conductor or semiconductor has a two-layered structure consisting of a conductive polymer formed on a metallic oxide.

In the above-described capacitor, the metallic oxide can be an oxide of at least one of manganese, nickel, and copper. The metallic oxide may preferably be manganese dioxide.

In the capacitor of the present invention, the conductive polymer is preferably a polypyrrole or a TCNQ type complex.

In the capacitor of the present invention, a dielectric film consisting mainly of a perovskite type composite oxide which has a general formula of $ATiO_3$ (where A denotes Ba or Sr) is formed on the surface of porous sintered body made of a metal consisting mainly of titanium, and further an electrode consisting mainly of conductor or semiconductor is formed on the dielectric film. Consequently, the surface area of sintered body which acts as the electrode and the surface area of an electrode consisting of a conductor or semiconductor can be increased without increasing the size of sintered body. As a result, a large electrostatic capacity is realized without enlarging the capacitor size.

By increasing the porosity of the porous sintered body to about 20% or more, the porous sintered body substantially increases its specific surface area and increases the electrostatic capacity. In addition, the formation of the dielectric film and formation of the electrode consisting of a conductor or semiconductor can be performed easily. Other metals or other materials can be present in the sintered body in minor amounts provided by do not adversely effect the basic characteristics of the body.

According to the method for manufacturing capacitor of the present invention, the sintered body is subjected to a hydrothermal treatment under predetermined conditions to readily form a perovskite composite oxide having an excellent dielectric characteristic onto any shape of sintered body surface.

Also, a perovskite composite oxide can be formed with increased efficiency in the hydrothermal treatment of the sintered body by immersing the electrode in the hydrothermal treatment solution (aqueous alkaline solution) and by simultaneously with the hydrothermal treatment performing an electrolysis by passing current between the sintered body and the electrode.

Also, when the conductor or semiconductor formed on the surface of the dielectric film is a conductive polymer and this polymer is made from a TCNQ type complex or a polypyrrole, it is not necessary to conduct the hydrothermal treatment at an elevated temperature. Accordingly, the capacitor can be produced without damaging the dielectric film.

Further, the dielectric film consists mainly of a perovskite type composite film which has a general formula of $ATiO_3$ (where A denotes Ba or Sr) and is formed on the surface of a sintered body to provide further larger electrostatic capacity.

Also, the conductor or semiconductor which is formed on the surface of dielectric film can be a two-layered structure consisting of a conductive polymer formed on the metallic oxide. Thus a favorable insulation property is obtained by forming a barrier between the dielectric film and the metallic oxide, and the current is introduced to the counter-electrode at a low resistance through the conductive polymer. As a result, a capacitor having an excellent high frequency characteristic can be provided.

DESCRIPTION OF THE PREFERRED EMBODIMENTS

Figure 1:
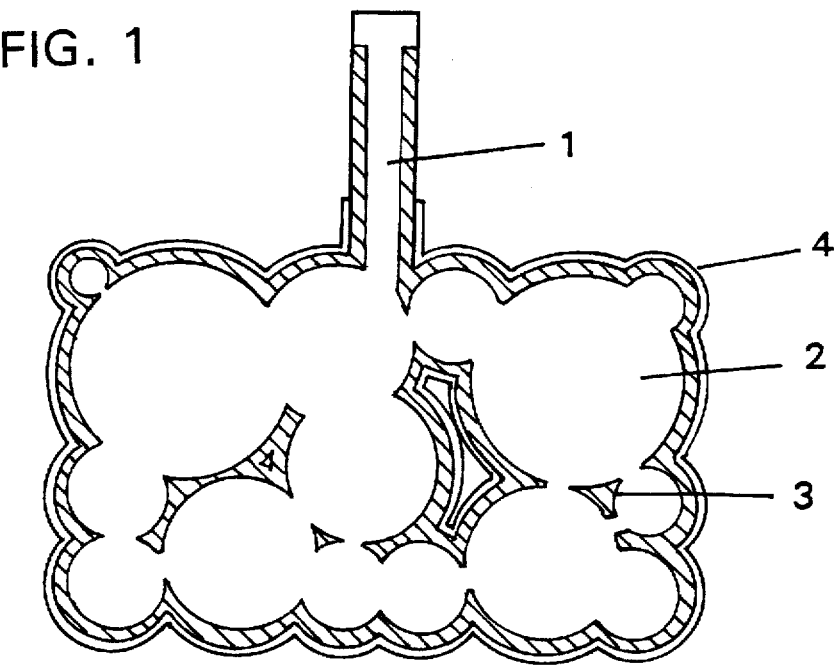
FIG. 1 is a part-sectional view of a porous sintered body of capacitor of the present invention.

Preferred embodiments of the present invention are described below referring to the drawings.

FIG. 1 is an enlarged part-sectional view of a porous sintered body of a capacitor of the present invention. The sintered body comprises a titanium lead wire 1 which is buried in the sintered body, a porous sintered body 2, a dielectric film 3 formed on the surface of the sintered body, and an electrode 4 which is made of a conductor or semiconductor formed on the surface of the dielectric film.

Figure 2:
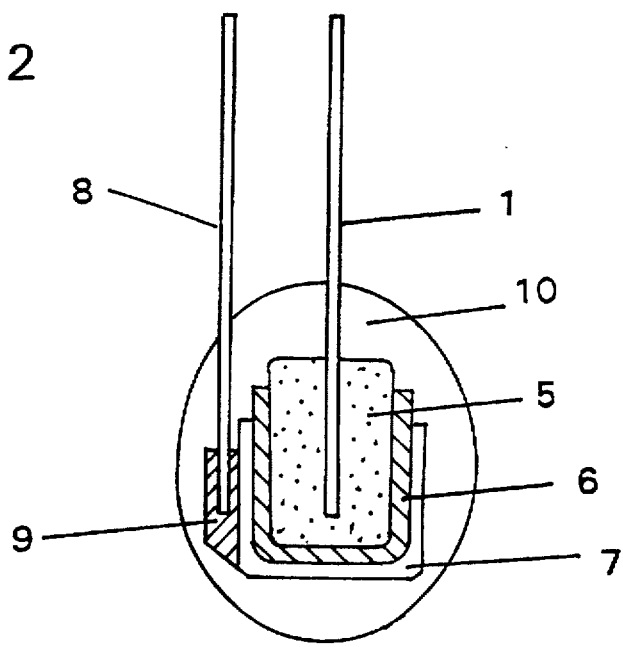
FIG. 2 is a cross-sectional view of a capacitor of the present invention.

FIG. 2 is a cross-sectional view of a capacitor of the present invention. The capacitor comprises a titanium wire 1, a capacitor element 5 formed by a porous sintered body, a graphite layer 6, a silver electrode layer 7, a lead 8, a solder 9, and an external resin 10.

Figure 3:
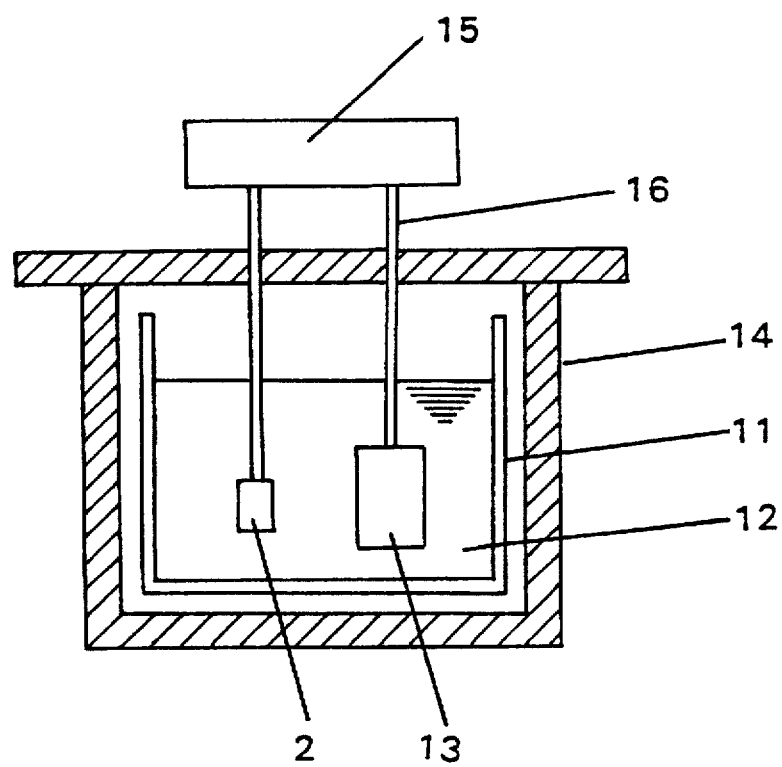
FIG. 3 is a schematic drawing of an apparatus for forming a dielectric film on a porous sintered body.

FIG. 3 is a schematic drawing of an apparatus for forming a dielectric film on a porous sintered body. The apparatus is provided with a beaker 11 made of fluororesin, a hydrothermal treatment solution 12, an autoclave 14, a direct current power source 15 and a pair of platinum wires 16. A porous sintered body 2 and a platinum plate 13 are attached to the tip of each of the platinum wires 16.

Preferred Embodiment 1

A porous sintered body made of titanium metal was prepared by molding a titanium metal powder having an average particle size of 50 μm into a cylindrical shape. During the molding stage, a part of a titanium wire which would become the electrode was buried in the titanium metal powder. Then, the molded shape was fired at 800° C. under a vacuum ranging of $5 \times 10^{-6}$ to $3 \times 10^{-7}$ Torr to obtain the porous sintered body.

This porous sintered body was immersed in a hydrothermal treatment solution containing 0.5 moles/l of aqueous strontium hydroxide adjusted to pH 14 using sodium hydroxide and held at 150° C. for 60 min. to conduct the hydrothermal treatment. Thus a dielectric film 3 consisting of a polycrystalline thin film of strontium titanate was directly formed on the surface of the porous sintered body 2 at a thickness of about 0.3 μm, as shown in FIG. 1.

The sintered body on which was formed by the strontium titanate thin film was further immersed in a solution of manganese nitrate. Then the strontium titanate thin film was treated by heating at a temperature of 200° C. to 400° C. to form a manganese dioxide layer on the surface of the strontium titanate thin film to prepare a capacitor element 5 comprising the porous sintered body 2, the dielectric film 3, the electrode 4 made of a conductor or semiconductor, and the titanium wire 1.

Then, similar to the case of ordinary solid electrostatic capacitors, a graphite layer 6 was formed around the capacitor element 5, as shown in FIG. 2, and further a counter-electrode was formed by placement of a silver electrode layer 7. A lead 8 was attached to the silver electrode using solder 9, and a coating of the external resin 10 was applied to fabricate the capacitor.

Electrostatic capacity, tan δ, and insulation resistance were measured for the thus fabricated capacitor. The result is listed below.

Electrostatic capacity (at frequency 1 kHz, voltage 1 Vrms): 10.2 μF tan δ(at frequency 1 kHz, voltage 1 Vrms) : 5.6%

Insulation resistance (at voltage 6.3 Vdc, after 120 sec.): $1.3 \times 10^7 \Omega$ Preferred Embodiment 2

First, a porous sintered body was prepared using the same procedure as in Preferred Embodiment 1.

A dielectric film was formed on the porous sintered body employing electrolysis by using the apparatus shown in FIG. 3. The solution for hydrothermal treatment 12 was prepared from an aqueous solution containing 0.5 moles/l of barium hydroxide by adjusting the pH value to 13.5 using sodium hydroxide. The porous sintered body 2 and a platinum plate 13 were immersed in the hydrothermal treatment solution 12 in a fluororesin beaker 11. At the same time, a pair of platinum wires 16 which were coated with fluororesin were connected to the porous sintered body 2 and the platinum plate 13, respectively. These platinum wires were wired in advance to enable the charge of electric power, even when the autoclave 14 is air-tightly closed, from an external direct current power source 15 to the porous sintered body 2 and the platinum plate 13. Then, the autoclave 14 was air-tightly closed with the porous sintered body 2 and the platinum plate 13 immersed in the hydrothermal treatment solution 12 in the fluororesin beaker 11.

The autoclave was heated to 150° C. in this state, and the temperature was maintained for 60 min. to perform the hydrothermal treatment along with a treatment of constant-voltage electrolysis by impressing 10 V of direct current voltage between the porous sintered body 2 and the platinum plate 13. After these treatments, the porous sintered body 2 was washed by ultrasonic waves in distilled water and dried at 120° C. for 60 min.

Thus a polycrystalline thin film of barium titanate having a thickness of 1.0 μm as the dielectric film was formed on the whole surface of the porous sintered body 2. With a method for forming a dielectric film using solely the hydrothermal treatment without applying electrolysis, it takes several hours to several tens of hours to grow the film to a thickness of about 0.5 μm or more, whereas when the method to form a dielectric film is accompanied by the electrolysis as in the case of Preferred Embodiment 2 a dielectric film having several microns of thickness formed within several hours.

The dielectric film was fabricated by the above-described procedure, and a capacitor was fabricated using a similar method as in Preferred Embodiment 1.

Electrostatic capacity, tan δ, and insulation resistance were measured for the thus fabricated capacitor. The result is listed below.

Electrostatic capacity (at frequency 1 kHz, voltage 1 Vrms): 6.1 μF tan δ (at frequency 1 kHz, voltage 1 Vrms) : 7.4%

Insulation resistance (at voltage 6.3 Vdc, after 120 sec.): $1.1 \times 10^7 \Omega$ Preferred Embodiment 3

Porous sintered bodies made of titanium metal and having various porosity grades were prepared. That is, titanium metal powder of 50 μm in average particle size was molded into a cylindrical shape at the density listed in Table 1 for individual cylinders. During the molding stage, a part of a titanium wire was buried in the titanium metal powder as one side of the leads. Then, the compact was fired in a vacuum of $5 \times 10^{-6}$ Torr or higher vacuum at a temperature given in Table 1 to obtain the porous sintered body. The density of the thus obtained sintered body was determined to calculate the porosity.

Next, a dielectric film was formed on the surface of the porous sintered body. That is, an aqueous solution was prepared as the hydrothermal treatment solution by mixing either 0.5 moles/l of barium hydroxide or strontium hydroxide, or a combination 0.25 moles/l of barium hydroxide and 0.25 moles/l of strontium hydroxide, and by adjusting the pH value of the solution to 13.5 using sodium hydroxide. In the same way as in Preferred Embodiment 2, a strontium titanate thin film was formed on the surface of the porous sintered body by carrying out the hydrothermal treatment and the constant-voltage electrolysis. Then the sintered body was washed by ultrasonic waves and dried.

After the dielectric film was formed, the surface thereof was further coated with a semiconductor manganese dioxide layer following the same procedure as in Preferred Embodiment 1 to prepare a capacitor element.

After that, as in the case of ordinary solid electrostatic capacitors, a graphite layer and a silver electrode layer were successively formed to make an external electrode, the other lead was attached to the sintered body by soldering, and by applying the external resin, the capacitor was fabricated.

Electrostatic capacity (at frequency 1 kHz, voltage 1 Vrms), tan δ (at frequency 1 kHz, voltage 1 Vrms), and insulation resistance (at voltage 6.3 Vdc, after 120 sec.) were determined for the thus fabricated capacitors. The result is listed in Table 1. The samples with the (*) mark are outside of the scope of the present invention.

TABLE 1

| Sample No. | Molded shape density (g/cm³) | Firing temp. (°C.) | Porosity (%) | Hydroxide | Electro-static capacity (μF) | tan δ (%) | Insulation resistance (Ω) |
|---|---|---|---|---|---|---|---|
| 1 | 2.9 | 900 | 29.8 | Sr | 2.2 | 3.4 | $1.2 \times 10^8$ |
| 2 | 2.9 | 1000 | 27.6 | Sr | 2.0 | 3.2 | $1.2 \times 10^8$ |
| 3 | 2.9 | 1100 | 21.2 | Sr | 1.8 | 3.2 | $1.5 \times 10^8$ |
| 4 | 3.2 | 900 | 23.0 | Ba | 5.3 | 6.3 | $1.3 \times 10^7$ |
| 5 | 3.2 | 1000 | 20.4 | Ba | 4.9 | 6.0 | $1.4 \times 10^7$ |
| *6 | 3.2 | 1100 | 17.3 | Ba | 2.6 | 4.1 | $2.7 \times 10^7$ |
| 7 | 3.4 | 900 | 21.1 | Ba + Sr | 7.2 | 5.8 | $1.8 \times 10^7$ |
| *8 | 3.4 | 1000 | 17.4 | Ba + Sr | 3.8 | 3.9 | $3.5 \times 10^7$ |
| *9 | 3.4 | 1100 | 15.7 | Ba + Sr | 3.1 | 4.0 | $4.3 \times 10^7$ |

As shown in Table 1, the porosity of the porous sintered body is preferably about 20% or more. A porous sintered body having a porosity of less than about 20% gives less substantial specific surface area so that the electrostatic capacity of the capacitor obtained from a dielectric film having the same composition as that of the sintered body becomes small, which is unfavorable.

Preferred Embodiment 4

Porous sintered bodies were prepared using titanium metal powder having average particle sizes of 30 μm, 50 μm, 150 μm, and 300 μm, respectively, under the various firing temperatures and vacuum levels given in Table 2, and with the similar procedures as in Preferred Embodiment 1 for the other conditions.

Capacitors were fabricated using the method for forming dielectric film accompanied by electrolysis similar to the case of Preferred Embodiment 2 covering the steps from the preparation of dielectric film made of strontium titanate to the fabrication of the capacitor.

Table 2 shows the measurement results for these capacitors. The Sample Nos. with the (*) mark are outside of the scope of the present invention.

TABLE 2

| Sample No. | Average particle size (μm) | Firing temp. (°C.) | Ultimate vacuum (Torr) | Electrostatic capacity (μF) | tan δ (%) | Insulation resistance (Ω) |
|---|---|---|---|---|---|---|
| *1 | 30 | 450 | $3 \times 10^{-7}$ | 5.1 | 9.7 | $1.3 \times 10^{4}$ |
| 2 | 30 | 500 | $3 \times 10^{-7}$ | 4.5 | 4.9 | $4.3 \times 10^{7}$ |
| 3 | 30 | 600 | $3 \times 10^{-7}$ | 4.2 | 4.2 | $4.7 \times 10^{7}$ |
| 4 | 50 | 700 | $3 \times 10^{-7}$ | 2.5 | 3.4 | $1.0 \times 10^{8}$ |
| 5 | 50 | 700 | $5 \times 10^{-6}$ | 2.4 | 3.4 | $1.1 \times 10^{8}$ |
| 6 | 50 | 700 | $7 \times 10^{-5}$ | 2.4 | 3.5 | $1.1 \times 10^{8}$ |
| 7 | 50 | 700 | $1 \times 10^{-4}$ | 2.2 | 3.1 | $1.2 \times 10^{8}$ |
| *8 | 50 | 700 | $6 \times 10^{-3}$ | 1.3 | 7.5 | $2.3 \times 10^{7}$ |
| 9 | 150 | 700 | $3 \times 10^{-7}$ | 0.96 | 3.3 | $2.8 \times 10^{8}$ |
| 10 | 150 | 850 | $3 \times 10^{-7}$ | 0.89 | 3.2 | $3.0 \times 10^{8}$ |
| 11 | 150 | 1000 | $3 \times 10^{-7}$ | 0.81 | 3.1 | $3.2 \times 10^{8}$ |
| *12 | 150 | 1100 | $3 \times 10^{-7}$ | 0.38 | 2.6 | $5.8 \times 10^{8}$ |
| *13 | 300 | 900 | $3 \times 10^{-7}$ | 0.42 | 2.4 | $3.1 \times 10^{7}$ |

As clearly shown in Table 2, the average particle size of titanium metal powder used for forming the porous sintered body is preferably 150 μm or less. A powder having an average particle size larger than 150 μm gives less surface area of the sintered body so that the electrostatic capacity of the capacitor becomes smaller, which is unfavorable.

Firing is preferably conducted at a vacuum level of about $1 \times 10^{-4}$ Torr or at a higher vacuum. A vacuum lower than $1 \times 10^{-4}$ Torr induces oxide-forming reactions on the metal surface during sintering, thus increasing the tan δ, which is not preferable.

Further, the firing temperature is preferably in a range between about 500° C. to 1000° C. A firing temperature below 500° C. makes it difficult to obtain a satisfactorily sintered body. A firing temperature exceeding 1000° C. results in a smaller surface area of the sintered body, thereby making the electrostatic capacity of the obtained capacitor smaller, which is unfavorable.

Preferred Embodiment 4 used a hydroxide as the ion source of barium and strontium. However, the ion source is not limited to a hydroxide. Also, for the pH adjustment agent, potassium hydroxide, lithium hydroxide, and hydroxides other than sodium hydroxide are applicable.

As for the electrode formed on the dielectric film, not only the semiconductor manganese dioxide which was used in Preferred Embodiment 4 but also other conductor or semiconductors, such as electrolyte or organic materials, may be used.

Effects of the Invention

As made clear in the explanation, the capacitor of the present invention comprises a porous sintered body, a dielectric film on the surface of the sintered body, a conductor or semiconductor on the surface of the dielectric film, and a counter-electrode which conducts to the conductor or semiconductor film. Accordingly, a capacitor having small size and large capacity is obtained. Since the dielectric film consists mainly of a perovskite type composite oxide, the dielectric coefficient is higher than that of a single oxide, and thus the obtained capacitor has a larger capacity.

The method for manufacturing the capacitor enables the formation of the dielectric film directly on the porous sintered body, so the manufacturing process does not require complex steps, and the product is produced readily at a low cost.

Preferred Embodiment 5

First, a porous sintered body made of titanium metal was prepared. That is, a titanium metal powder having an average particle size of 50 μm was molded into a cylindrical shape. During the molding stage, a part of a titanium wire was buried into the metallic powder as one side of the electrode emergence leads. Then, the molded body was fired in a vacuum of from $5 \times 10^{-6}$ to $3 \times 10^{-7}$ Torr at a temperature of 800° C. to obtain the porous sintered body.

A dielectric film was formed on the surface of the porous sintered body using the apparatus shown in FIG. 3. That is, a solution 12 for hydrothermal treatment was prepared from an aqueous solution containing 0.5 moles/l of strontium hydroxide by adjusting the pH value to 13.5 using sodium hydroxide. The porous sintered body 2 and a platinum plate 13 were immersed in the hydrothermal treatment solution 12 in a fluororesin beaker 11. At the same time, a pair of platinum wires 16 which were each coated by fluororesin were connected to the porous sintered body 2 and the platinum plate 13, respectively. These platinum wires were wired in advance for enabling the supply of electric power, even when the autoclave 14 is air-tightly closed, from an external direct current power source 15 to the porous sintered body 2 and the platinum plate 13. Then, the autoclave 14 was air-tightly closed under a condition where the porous sintered body 2 and the platinum plate 13 were immersed in the hydrothermal treatment solution 12 in the fluororesin beaker 11.

The autoclave was heated to 150° C. under these conditions, and the temperature was maintained for 60 min. to perform a hydrothermal treatment along with the simultaneous constant-voltage electrolysis by applying 10 V of direct current voltage between the porous sintered body 2 and the platinum plate 13. After these treatments, the porous sintered body 2 was washed by ultrasonic waves in distilled water, and it was dried at 120° C. for 60 min.

Thus, a polycrystalline thin film of strontium titanate having a thickness of 1.0 μm was formed using this method as the dielectric film 3 on the entire surface of the porous sintered body 2, as shown in FIG. 1.

Then a film of TCNQ type complex salt, which is a conductive organic polymer material, was formed as the electrode 4 made of conductor or semiconductor on the surface of the dielectric film 3. That is, aliquots of 100 wt. parts of N-n-butyl-isoquinolinium (TCNQ)$_2$, 10 wt. parts of pentaerythritol, and 10 wt. parts of TCNQ were weighed, and acetone was added to these to obtain a paste. The paste was uniformly mixed until the acetone vaporized and the paste dried. The procedure of acetone addition and removal was repeated three times, after which the obtained material was dried at about 40° C. under a reduced pressure to completely evaporate the acetone. The dried material was pulverized to obtain a solid electrolyte of an organic polymer material.

Then, the electrolyte was packed in an aluminum cylindrical casing. The electrolyte was then heated to about 260° C. and melted. The porous sintered body 2 which was coated by the dielectric film 3 consisting of polycrystalline strontium titanate was heated to the same temperature as that of the electrolyte for about 20 seconds, and was then immersed in the melt. The electrolyte was then cooled to form the electrode on the dielectric film.

Then, as shown in FIG. 2, a graphite layer 6 and a silver electrode 7 were successively formed on the capacitor element 5 to form a counter-electrode, as in the case of an ordinary solid electrolytic capacitor. The other lead 8 was attached to the silver electrode 7 by solder 9, and the external resin 10 was applied to obtain the capacitor.

Preferred Embodiment 6

First, a dielectric film consisting of polycrystalline strontium titanate having a thickness of about 1.0 µm was formed on the surface of the porous sintered body using a similar procedure as in Preferred Embodiment 5.

Next, a polypyrrole film, which is a conductive organic polymer material, was formed on the surface of the dielectric film. That is, ferric chloride, aqueous hydrogen peroxide, etc., as the oxidizing agent was dissolved to water or in an organic solvent such as acetonitrile, etc. By adding a pyrrole monomer to the mixture, a polypyrrole precoat layer in a powder state was obtained by a chemical polymerization process.

In a support electrolyte in which a pyrrole monomer was dissolved, electrolytic polymerization was carried out using the porous sintered body with the precoat layer as the anode to form a layered polypyrrole having favorable conductivity.

Then, the porous sintered body was integrated with an external electrode, leads, and external resin using a similar procedure as in Preferred Embodiment 1 to obtain the capacitor.

COMPARATIVE EXAMPLE 1

By following a similar procedure as in Preferred Embodiment 5, a manganese dioxide layer was formed on the thin film of strontium titanate by immersing the porous sintered body coated with a thin film of strontium titanate in a solution of manganese nitrate, and by heat-treating at 200° C. to 400° C. Then, a counter-electrode, leads, and an external resin were combined to the porous sintered body in a similar procedure as in Preferred Embodiment 1 to obtain the capacitor.

For each of the capacitors thus fabricated in Preferred Embodiments 5 and 6 and Comparative Example 1, the electrostatic capacity (at frequency 1 kHz, voltage 1 Vrms), tan δ(at frequency 1 kHz, voltage 1 Vrms), and insulation resistance (at voltage 6.3 Vdc, after 120 sec.) were determined. The results are shown in Table 3.

TABLE 3

| | Electrostatic capacity (µF) | tan δ (%) | Insulation resistance (Ω) | Equivalent series resistance (mΩ) |
|---|---|---|---|---|
| Preferred Embodiment 1 | 1.9 | 3.2 | $1.2 \times 10^8$ | 920 |
| Preferred Embodiment 2 | 2.0 | 3.2 | $1.1 \times 10^8$ | 890 |
| Comparative Example 1 | 2.0 | 3.1 | $7.6 \times 10^7$ | 3100 |

As made clear in the above results, when the conductor or semiconductor formed on the surface of the dielectric film was a conductive polymer, and when the polymer consists of a TCNQ complex salt or a polypyrrole, the capacitor thus fabricated shows higher insulation resistance, less equivalent series resistance, and superior high frequency characteristics compared to those of the conventional capacitor using manganese dioxide.

Preferred Embodiments 5 and 6 used a hydroxide as the ion source of barium and strontium. However, the ion source is not limited to a hydroxide. Also for the pH adjustment agent, potassium hydroxide, lithium hydroxide, and hydroxides other than sodium hydroxide are applicable.

Since the capacitor of the present invention consists mainly of a perovskite type complex oxide, the obtained dielectric coefficient becomes higher than that of a single oxide, and thus the obtained capacitor has a larger capacity.

Since the conductive polymer material which was formed on the surface of the above-described dielectric film is a polypyrrole or a TCNQ complex salt, either of which shows favorable conductivity, the fabricated capacitor provides small equivalent series resistance and excellent high frequency characteristics.

In addition, the conductive polymer material, unlike manganese dioxide, needs no heat treatment after formation on the dielectric film. Accordingly, less chemical effects occur to the dielectric film consisting of a perovskite type composite oxide during the capacitor fabrication process, thus providing a high quality capacitor.

Preferred Embodiment 7

First, a porous sintered body made of timenium metal was obtained. That is, titanium metal powder having an average particle size of 50 µm was molded into a cylindrical shape. During the molding stage, a part of a titanium wire was buried into the metallic powder to mold them together to form one side of the emergence leads. Then, the molded shape was fired at 800° C. in a vacuum ranging from $5 \times 10^{-6}$ to $3 \times 10^{-7}$ Torr to obtain the porous sintered body.

Next, a dielectric film was formed on the porous sintered body using the apparatus shown in FIG. 3. That is, as shown in FIG. 3, the solution 12 for hydrothermal treatment was prepared from an aqueous solution containing 0.5 moles/l of strontium hydroxide by adjusting the pH value to 13.5 using sodium hydroxide. Next, the porous sintered body 2 and a platinum plate 13 were immersed in the hydrothermal treatment solution 12 in a fluororesin beaker 11. At the same time, a pair of platinum wires 16 which were coated by a fluororesin were connected to the porous sintered body 2 and the platinum plate 13, respectively. These platinum wires 16 were wired in advance to enable the supply of electric power, even when the autoclave 14 is air-tightly closed, from an external direct current power source 15 to the porous sintered body 2 and the platinum plate 13. Then, the autoclave 14 is air-tightly closed under a condition such that the porous sintered body 2 and the platinum plate 13 were immersed in the hydrothermal treatment solution 12 in the fluororesin beaker 11.

The autoclave was heated to 150° C. under the above-described condition, and the temperature was maintained for 60 min. to perform hydrothermal treatment along with constant-voltage electrolysis by applying 10 V of direct current voltage between the porous sintered body 2 and the platinum plate 13. After these treatments, the porous sintered body 2 was washed by ultrasonic waves in distilled water, and it was dried at 120° C. for 60 min.

In this way, a dielectric film 3 consisting of strontium titanate having a thickness of about 1.0 µm was formed on the surface of the porous sintered body 2.

Next, the porous sintered body 2 coated by the dielectric 3 was immersed in a solution of manganese nitrate, and the dielectric 3 was heat-treated at 200° C. to 400° C. to form a manganese dioxide layer on the surface of the dielectric film 3 consisting of strontium titanate. The process for forming the manganese dioxide layer was repeated five times.

In a support electrolyte in which a pyrrole monomer was dissolved, electrolytic polymerization was carried out using the porous sintered body 2 with the precoat layer as the anode to form a layered polypyrrole having favorable conductivity. Then the electrode 4 having a two-layered structure and consisting of a conductor or semiconductor was formed.

Preferred Embodiment 8

A porous sintered body was obtained using a similar procedure as in Preferred Embodiment 7. Then a dielectric film consisting of barium titanate having a thickness of about 1.0 μm was formed on the entire surface area of the porous sintered body using a solution for hydrothermal treatment prepared from 0.5 moles/l of barium hydroxide by adjusting the pH value to 14.0 using sodium hydroxide.

The porous sintered body coated with the dielectric film was immersed in an alkoxide of nickel (for example, "Naftex" produced by Nippon Chemical Industrial Co., Ltd.), and then was heat-treated at a temperature ranging from 300° C. to 450° C. to form a nickel oxide layer on the surface of the dielectric film. The procedure for forming the nickel oxide layer was repeated five times.

Further, in a support electrolyte in which a pyrrole monomer was dissolved, electrolytic polymerization was carried out using the porous sintered body with the nickel oxide layer as the anode to form a layered polypyrrole having favorable conductivity.

Preferred Embodiment 9

A dielectric film consisting of barium titanate having a thickness of about 1.0 μm was formed on the entire surface area of the porous sintered body using a similar procedure as in Preferred Embodiment 8. The porous sintered body was immersed in an alkoxide of copper (for example, "Naftex" produced by Nippon Chemical Industrial Co., Ltd.), and then was heat-treated at a temperature ranging from 300° C. to 450° C. in a nitrogen atmosphere to form a copper oxide layer (a mixture of copper oxide and cuprous oxide) on the surface of the dielectric film. The procedure for forming the copper oxide layer was repeated five times.

Further, in a support electrolyte in which a pyrrole monomer was dissolved, an electrolytic polymerization was carried out using the porous sintered body with the copper oxide layer as the anode to form a layered polypyrrole having favorable conductivity.

Preferred Embodiment 10

A dielectric film consisting of barium titanate having a thickness of about 1.0 μm was formed on the entire surface area of the porous sintered body using a similar procedure as in Preferred Embodiment 8.

Next, an aqueous solution containing about 0.3 mol % of potassium permanganate was heated to 65° C. The porous sintered body coated by the dielectric film was immersed in the solution under agitation. The solution was maintained at an acidic pH by adding, dropwise, methanol and an aqueous solution of nitric acid to form $MnO_2$ film of a thickness of about 0.5 μm on the sintered body after about 1 hr.

In an electrolyte in which a support electrolyte and pyrrole monomer were dissolved, electrolytic polymerization was carried out using the porous sintered body with the manganese oxide layer as the anode to form a layered polypyrrole having favorable conductivity.

COMPARATIVE EXAMPLE 2

A porous sintered body on which a dielectric film consisting of strontium titanate was formed was immersed in a solution of manganese nitrate. Next, the sintered body was heat-treated at a temperature ranging from 200° C. to 400° C. to form a metallic oxide layer that is a manganese dioxide layer on the surface of the dielectric film. The layer-forming process was repeated about 20 times.

For the porous sintered bodies coated by the dielectric film and the conductor or semiconductor prepared in Preferred Embodiments 7 through 10 and Comparative Example 2, a graphite layer 6 and a silver electrode layer 7 were successively formed on the capacitor element 5 to make a counter-electrode, as shown in FIG. 2, in a manner similar to that for ordinary solid electrostatic capacitors, and the other lead 8 was attached to the silver electrode using solder 9, and an external resin 10 was applied to fabricate the capacitor.

For each of the capacitors thus fabricated, the electrostatic capacity (at frequency 1 kHz, voltage 1 Vrms), tan δ (at frequency 1 kHz, voltage 1 Vrms), and insulation resistance (at voltage 6.3 Vdc, after 120 sec.) and equivalent series resistance (ESR; frequency 100 kH, voltage 1 Vrms) were determined. The results are shown in Table 4.

TABLE 4

|  | Electrostatic capacity (μF) | tan δ (%) | Insulation resistance (Ω) | Equivalent series resistance (mΩ) |
|---|---|---|---|---|
| Preferred Embodiment 1 | 2.0 | 2.6 | $9.3 \times 10^7$ | 0.8 |
| Preferred Embodiment 2 | 1.6 | 3.6 | $6.8 \times 10^7$ | 1.6 |
| Preferred Embodiment 3 | 1.7 | 3.3 | $3.5 \times 10^7$ | 1.7 |
| Preferred Embodiment 4 | 1.9 | 2.7 | $8.2 \times 10^7$ | 0.9 |
| Comparative Example 2 | 2.0 | 3.1 | $5.6 \times 10^7$ | 3.1 |

As understood for the above-described results, the capacitor of the Comparative Example 2 where no layer of conductive polymer was formed exhibited an increase in the equivalent series resistance, even though the capacitor used the same kind of porous sintered body as in Preferred Embodiment 1 and used strontium titanate thin film and manganese dioxide as the metallic oxide.

Comparative Example 2 used a hydroxide as the ion source of barium and strontium. However, the ion source is not limited to a hydroxide. Also for the pH adjustment agent, potassium hydroxide, lithium hydroxide, and hydroxides other than sodium hydroxide are applicable. The metallic oxide is not necessarily limited to the above-described nitrate and alkoxide. The conductive polymer material shown was a polypyrrole, but a TCNQ type complex salt may also be applied.

As clearly understood from the description given above, the conductive polymer formed on the surface of the dielectric film of the present invention can be made from a polypyrrole which has favorable conductivity, so the equivalent series resistance becomes lower and the high frequency characteristic is superior to the conventional capacitor which uses solely manganese dioxide. Thus the capacitor of the present invention is particularly effective.

What is claimed is:

1. A capacitor comprising: a porous sintered body of titanium metal; a dielectric film of a perovskite type composite oxide having a general formula of $ATiO_3$ where A denotes Ba or Sr or both on at least a part of the surface of said sintered body; a conductor or semiconductor on the surface of said dielectric film; and a counter-electrode which conducts to said conductor or semiconductor and which faces said sintered body; wherein the porosity of said porous sintered body is about 20% or more.

2. The capacitor of claim 1 wherein said conductor or semiconductor comprises a conductive polymer.

3. The capacitor of claim 2, wherein said conductive polymer is a TCNQ complex salt or a polypyrrole.

4. The capacitor of claim 2 wherein said conductor or semiconductor has a two-layered structure of the conductive polymer over a metallic oxide.

5. The capacitor of claim 4, wherein said metallic oxide is an oxide of at least one of manganese, nickel and copper.

6. The capacitor of claim 5, wherein said metallic oxide is manganese dioxide.

7. The capacitor of claim 4, wherein said conductive polymer material is a polypyrrole or a TCNQ complex salt.

8. A capacitor comprising: a porous sintered body of titanium metal; a dielectric film of a perovskite type composite oxide having a general formula of $ATiO_3$ where A denotes Ba or Sr or both; a conductor or semiconductor on the surface of said dielectric film; and a counter-electrode which conducts to said conductor or semiconductor and which faces said sintered body; wherein said conductor or semiconductor comprises a conductive polymer material.

9. The capacitor of claim 8, wherein said conductive polymer is a TCNQ complex salt or a polypyrrole.

10. The capacitor of claim 8 wherein said conductor or semiconductor has a two-layered structure of the conductive polymer over a metallic oxide.

11. The capacitor of claim 10, wherein said metallic oxide is an oxide of at least one of manganese, nickel and copper.

12. The capacitor of claim 11, wherein said metallic oxide is manganese dioxide.

13. The capacitor of claim 10, wherein said conductive polymer material is a polypyrrole or a TCNQ complex salt.

14. A method for manufacturing a capacitor comprising the steps of: immersing a porous sintered body of titanium metal in an aqueous solution which has a pH value of about 13 or higher and which contains at least strontium or barium or both at a concentration of about 0.1 mole/l or more of concentration; causing a perovskite composite oxide film having a general formula of $ATiO_3$ where A denotes Ba or Sr or both to form as a dielectric film on the surface of said sintered body; forming a conductor or a semiconductor electrode on the surface of said perovskite composite oxide film; and forming a counter-electrode which conducts to said conductor or semiconductor electrode and which faces said sintered body.

15. The method for manufacturing the capacitor of claim 14, wherein causing the perovskite composite oxide to form is effected by heating the solution and the sintered body to a temperature of about 100° C. or above.

16. The method for manufacturing the capacitor of claim 14, wherein the step of causing the perovskite composite oxide to form includes imposing an electric current between an electrode which is immersed in the aqueous solution and said sintered body.

17. The method for manufacturing the capacitor of claim 16, including sintering a titanium powder having an average particle size of about 150 μm or less in a vacuum of about $1\times10^{-4}$ Torr or higher at a temperature ranging from about 500° C. to 1000° C. to form said porous sintered body.

18. The method for manufacturing the capacitor of claim 17, wherein the average particle size is 30 to 150 μm, the vacuum is $7\times10^{-5}$ to $3\times10^{-7}$ Torr, and the temperature during porous body formation is 600° C. to 850° C.

19. The method for manufacturing the capacitor of claim 14, including sintering a titanium powder having an average particle size of about 150 μm or less in a vacuum of about $1\times10^{-4}$ Torr or higher at a temperature ranging from about 500° C. to 1000° C. to form said porous sintered body.

20. The method for manufacturing the capacitor of claim 19, wherein the average particle size is 30 to 150 μm, the vacuum is $7\times10^{-5}$ to $3\times10^{-7}$ Torr, and the temperature during porous body formation is 600° C. to 850° C.

* * * * *